(12) United States Patent
Steinhauer

(10) Patent No.: US 10,753,857 B2
(45) Date of Patent: Aug. 25, 2020

(54) APPARATUS AND METHOD FOR MEASURING MICROSCOPIC OBJECT VELOCITIES IN FLOW

(71) Applicant: VISIONGATE, INC., Phoenix, AZ (US)

(72) Inventor: David Ethan Steinhauer, Lynnwood, WA (US)

(73) Assignee: VISIONGATE INC., Phoenix, AZ (US)

( * ) Notice: Subject to any disclaimer, the term of this patent is extended or adjusted under 35 U.S.C. 154(b) by 249 days.

(21) Appl. No.: 15/658,154

(22) Filed: Jul. 24, 2017

(65) Prior Publication Data

US 2019/0025193 A1 Jan. 24, 2019

(51) Int. Cl.
*G01N 21/17* (2006.01)
*G06T 7/246* (2017.01)
(Continued)

(52) U.S. Cl.
CPC ......... *G01N 21/17* (2013.01); *G01N 15/1429* (2013.01); *G01N 15/1463* (2013.01); *G01N 15/1468* (2013.01); *G01N 21/05* (2013.01); *G02B 21/002* (2013.01); *G02B 21/06* (2013.01); *G02B 21/365* (2013.01); *G06T 7/246* (2017.01); *G06T 7/33* (2017.01); *G01N 2015/0065* (2013.01); *G01N 2015/1006* (2013.01); *G01N 2015/1075* (2013.01); *G01N 2021/0346* (2013.01); *G01N 2021/052* (2013.01);
(Continued)

(58) Field of Classification Search
CPC .......... G02B 21/0004; G06T 7/70; A61B 1/00
See application file for complete search history.

(56) References Cited

U.S. PATENT DOCUMENTS 4,331,132 A * 5/1982 Mukasa ................... A61B 3/13
  348/79
4,919,536 A * 4/1990 Komine ................. G01P 5/001
  356/28

(Continued)

OTHER PUBLICATIONS

PCT/US18/43422, International Search Report, dated Oct. 10, 2018.
(Continued)

*Primary Examiner* — Pankaj Kumar
*Assistant Examiner* — Timothy R Newlin
(74) *Attorney, Agent, or Firm* — George A. Leone; Citadel Patent Law

(57) ABSTRACT

A method for measuring microscopic object velocities in fluid flow in a capillary tube including scanning a microscope focal plane through a fluid filled space for objects, where the scanning follows an interrupted repeating pattern having sub-patterns where the sub-patterns position the microscope focus plane beginning at a selected focus position at a first time and ending at the selected focus position at a later second time. A sensor registers images in image frames during the scanning. A first object image is registered in a first image frame at the selected focus position and a second object image is registered in a second image frame at the selected focus position. The object in the first object image and the second object image are identified as the same object. A processor determines a velocity for the identified object.

32 Claims, 10 Drawing Sheets

(51) Int. Cl.
*G06T 7/33* (2017.01)
*G02B 21/00* (2006.01)
*G02B 21/06* (2006.01)
*G02B 21/36* (2006.01)
*G01N 15/14* (2006.01)
*G01N 21/05* (2006.01)
*G01N 15/00* (2006.01)
*G01N 21/03* (2006.01)
*G01N 15/10* (2006.01)

(52) U.S. Cl.
CPC ........... *G01N 2021/1765* (2013.01); *G01N 2021/1787* (2013.01); *G06T 2207/10016* (2013.01); *G06T 2207/10056* (2013.01); *G06T 2207/30024* (2013.01)

(56) References Cited

U.S. PATENT DOCUMENTS

| | | | | |
|---|---|---|---|---|
| 5,333,044 | A * | 7/1994 | Shaffer | A61B 5/0261 250/356.1 |
| 5,799,101 | A | 8/1998 | Lee et al. | |
| 5,880,835 | A * | 3/1999 | Yamazaki | G01N 15/147 356/336 |
| 5,978,497 | A | 11/1999 | Lee et al. | |
| 6,211,955 | B1 * | 4/2001 | Basiji | G01J 3/2803 356/326 |
| 6,249,341 | B1 * | 6/2001 | Basiji | G01J 3/2803 356/318 |
| 6,522,775 | B2 * | 2/2003 | Nelson | G01N 15/147 382/133 |
| 7,738,945 | B2 | 6/2010 | Fauver et al. | |
| 7,835,561 | B2 | 11/2010 | Meyer et al. | |
| 7,907,765 | B2 | 3/2011 | Fauver et al. | |
| 8,155,420 | B2 | 4/2012 | Meyer et al. | |
| 8,254,023 | B2 * | 8/2012 | Watson | G02B 21/002 359/432 |
| 2002/0093641 | A1 * | 7/2002 | Ortyn | G01N 15/1012 356/28 |
| 2002/0159070 | A1 * | 10/2002 | Maeda | G01N 15/0205 356/496 |
| 2003/0086608 | A1 * | 5/2003 | Frost | G01N 15/147 382/173 |
| 2005/0046821 | A1 * | 3/2005 | Hanson | G01P 3/366 356/3.01 |
| 2010/0296713 | A1 | 11/2010 | Meyer et al. | |
| 2010/0322494 | A1 * | 12/2010 | Fauver | G01N 15/147 382/131 |
| 2011/0170105 | A1 | 7/2011 | Cui et al. | |
| 2012/0140171 | A1 | 6/2012 | Hirose et al. | |
| 2012/0191635 | A1 | 7/2012 | Bigio et al. | |
| 2014/0119630 | A1 | 5/2014 | Sowards-Emmerd et al. | |
| 2014/0296089 | A1 | 10/2014 | Holmes et al. | |
| 2015/0104786 | A1 | 4/2015 | Shirasuna et al. | |
| 2015/0140596 | A1 | 5/2015 | Mak et al. | |
| 2016/0249874 | A1 * | 9/2016 | Korporaal | A61B 6/507 382/131 |
| 2016/0370280 | A1 | 12/2016 | Yamamoto et al. | |
| 2017/0322232 | A1 * | 11/2017 | Ueda | G01P 3/36 |
| 2018/0272348 | A1 * | 9/2018 | Azpiroz | B01L 3/502761 |

OTHER PUBLICATIONS

PCT/US18/43422, Written Opinion Of The International Searching Authority, dated Oct. 10, 2018.

* cited by examiner

APPARATUS AND METHOD FOR MEASURING MICROSCOPIC OBJECT VELOCITIES IN FLOW

TECHNICAL FIELD

The present invention relates to optical tomography on a cellular and sub-cellular scale. More particularly, the invention relates to a method and apparatus for measuring microscopic object velocities in fluid flow in a capillary tube.

BACKGROUND

Lung cancer is the second most prevalent cancer in the United States and is the most lethal. Over 31 million patients in the United States (US) are at high risk for the development of lung cancer, primarily due to age, smoking history, and pollution and other factors including radon exposure, family history of lung cancer, etc. Approximately 160,000 US patients die of lung cancer each year. At the time of this writing, lung cancer can only be cured with surgery when detected in early stages, mainly stage I and II. However, lung cancer is known to be preceded by pre-cancerous conditions presenting as dysplastic cells. The detection of such pre-cancerous conditions can trigger preventative treatment that can reduce the risk of contracting lung cancer.

Advances in 3D imaging of biological cells using optical tomography have been implemented by Nelson as disclosed, for example, in U.S. Pat. No. 6,522,775, issued Feb. 18, 2003, and entitled "Apparatus and Method for Imaging Small Objects in a Flow Stream Using Optical Tomography," the full disclosure of which is incorporated by reference. Further major developments in the field are taught in Fauver et al., U.S. Pat. No. 7,738,945, issued Jun. 15, 2010, entitled "Method and Apparatus for Pseudo-Projection Formation for Optical Tomography," (Fauver '945) and Fauver et al., U.S. Pat. No. 7,907,765, issued Mar. 15, 2011, entitled "Focal Plane Tracking for Optical Microtomography," (Fauver '765) the full disclosures of Fauver '945 and Fauver '765 are also incorporated by reference. Building on the teachings therein, an early lung cancer detection technology has been developed by VisionGate, Inc., Phoenix, Ariz. to provide measurement advantages that have demonstrated a great improvement in the operating characteristics of conventional morphologic cytology analyses.

Processing in such an optical tomography system begins with specimen collection and preparation. For diagnostic applications in lung disease, patient sputum can be collected non-invasively in a clinic or at home. At the clinical lab, the sputum is processed to remove non-diagnostic material, fixed and then stained. Stained specimens are then mixed with an optical gel, and the suspension is injected into a microcapillary tube. Images of objects, such as cells, in the specimen are collected while the cells are rotated around 360-degrees relative to the image collection optics in an optical tomography system. The resultant images comprise a set of extended depth of field images from differing perspectives called "pseudo-projection images." The set of pseudo-projection images can be mathematically reconstructed using backprojection and filtering techniques to yield a 3D reconstruction of a cell of interest. Having isometric or roughly equal resolution in all three dimensions is an advantage in 3D tomographic cell imaging, especially for quantitative feature measurements and image analysis.

The 3D reconstructed digital image then remains available for analysis in order to enable the quantification through the measurement of sub-cellular structures, molecules or molecular probes of interest. An object such as a biological cell may be stained or labeled with at least one absorbing contrast agent or tagged molecular probe, and the measured amount and structure of this biomarker may yield important information about the disease state of the cell, including, but not limited to, various cancers such as lung, breast, prostate, cervical, stomach and pancreatic cancers, and various stages of dysplasia.

In order to obtain quality images of objects, such as biological cells in flow, accurate measurement of object velocities must be made. Accuracy is required in order to identify and track target images from one image frame to others at different times. One challenge to this requisite tracking presented by flowing objects is that they can be oriented randomly and tumble when flowing through liquid medium in a capillary tube, for example. Until the present invention, methods and systems lacked the ability to track such target objects in flow accurately and at an acceptably fast throughput rate.

BRIEF SUMMARY OF THE DISCLOSURE

The instant invention overcomes the deficiencies found in the art by providing, for the first time, a method and system for tracking microscopic target objects in flow at near real-time rates. An improved search pattern is disclosed with the advantages of increasing accuracy for measured object velocity and matching objects between different focus scans or images.

This summary is provided to introduce, in a simplified form, a selection of concepts that are further described below in the Detailed Description. This summary is not intended to identify key features of the claimed subject matter, nor is it intended to be used as an aid in determining the scope of the claimed subject matter.

A method for measuring microscopic object velocities in fluid flow in a capillary tube is disclosed. The method includes scanning a microscope focal plane through a fluid filled space for objects, where the scanning follows an interrupted repeating pattern having sub-patterns where the sub-patterns position the microscope focus plane beginning at a selected focus position at a first time and ending at the selected focus position at a later second time. A sensor registers images in image frames during the scanning. A first object image is registered in a first image frame at the selected focus position and a second object image is registered in a second image frame at the selected focus position. The object in the first object image and the second object image are identified as the same object. A processor determines a velocity for the identified object.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

Figure 1:
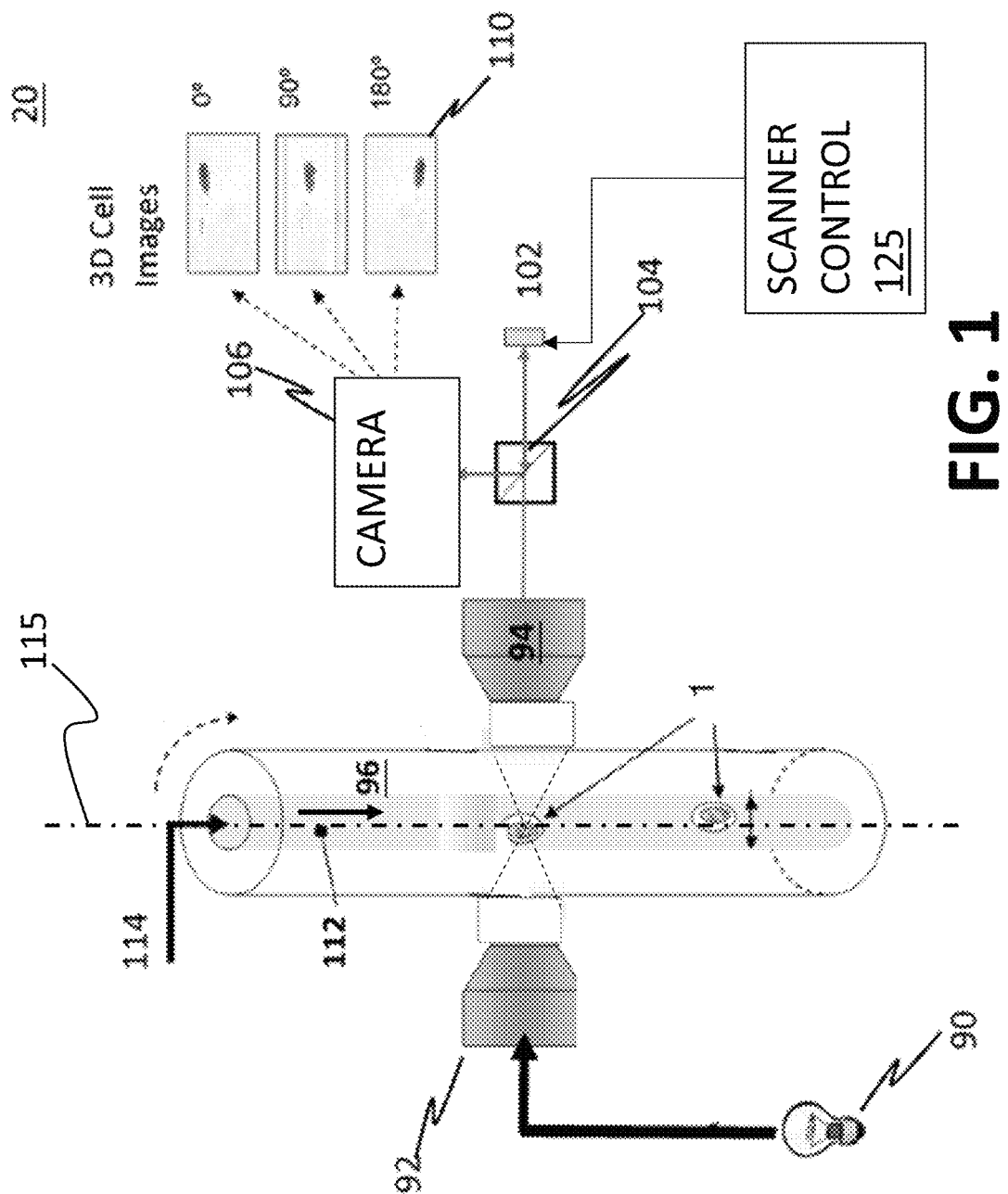
FIG. 1 schematically shows system components of a 3D optical tomography imaging system used in a lung cancer test system.

In the drawings, identical reference numbers call out similar elements or components. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not necessarily intended to convey any information regarding the actual shape of the particular elements, and have been solely selected for ease of recognition in the drawings.

DETAILED DESCRIPTION OF THE PREFERRED EMBODIMENTS

The following disclosure describes a method and apparatus for measuring microscopic object velocities in fluid flow. Several features of methods and apparatus in accordance with example embodiments are set forth and described in the figures. It will be appreciated that methods and apparatus in accordance with other example embodiments can include additional procedures or features different than those shown in the figures. Example embodiments are described herein with respect to measuring microscopic biological cell velocities in fluid flow in a capillary tube in an optical tomography cell imaging system. However, it will be understood that these examples are for the purpose of illustrating the principles, and that the invention is not so limited.

Definitions

Generally, as used herein, the following terms have the following meanings, unless the use in context dictates otherwise:

The use of the word "a" or "an" when used in conjunction with the term "comprising" in the claims or the specification means one or more than one, unless the context dictates otherwise. The term "about" means the stated value plus or minus the margin of error of measurement or plus or minus 10% if no method of measurement is indicated. The use of the term "or" in the claims is used to mean "and/or" unless explicitly indicated to refer to alternatives only or if the alternatives are mutually exclusive. The terms "comprise", "have", "include" and "contain" (and their variants) are open-ended linking verbs and allow the addition of other elements when used in a claim.

Reference throughout this specification to "one example" or "an example embodiment," "one embodiment," "an embodiment" or combinations and/or variations of these terms means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

"Adequacy" refers to the content of the specimen and defines a limit for target cells to determine if a sufficient cellular pellet has been analyzed.

"Capillary tube" has its generally accepted meaning and is intended to include transparent microcapillary tubes and equivalent items with an inside diameter generally of 500 microns or less, but larger diameters could be used.

"Capillary radius" means the radius of an object as referenced to the axial center locus of a capillary tube.

"Cell" means biological cell such as a human, mammal or animal cell.

"Cell-CT® platform" refers to an optical tomography system manufactured by VisionGate, Inc. of Phoenix, Ariz. incorporating teachings of the Nelson and Fauver patents referenced herein above and improvements of those teachings.

"Depth of field" is the length along the optical axis within which the focal plane may be shifted before an unacceptable image blur for a specified feature is produced.

"Enrichment" refers to the process of extracting target cells from a raw specimen. The process yields an enriched pellet whose cells can then be more efficiently imaged on the Cell-CT® system.

"Frame rate" refers to the number of images captured per second by a camera or image sensors and is typically measured in frames per second (fps).

"LuCED® test" refers to an early lung cancer detection test employing the Cell-CT® platform as developed by VisionGate, Inc. of Phoenix, Ariz. incorporating the teachings of the Nelson and Fauver patents referenced hereinabove and improvements of those teachings.

"The LuCED® process" refers to the mechanism of 3D cell reconstruction, classification to find abnormal cells, and pathology confirmation.

"Optical axis" refers to a line passing through the center of curvature of the lens or spherical mirror in parallel to the axis of symmetry. As used herein, optical axis substantially coincides with the "focus axis" of a microscope objective lens.

"Pseudo-projection" includes a single image representing a sampled volume of extent larger than the native depth of field of the optics where a pseudo-projection image thus formed includes an integration of a range of focal plane images from a fixed viewpoint. The concept of a pseudo-projection is taught in Fauver '945.

"Processor" and "computer processor" as used in this specification encompass a personal computer, a tablet computer, a smart phone, a microcontroller, a microprocessor, a field programmable object array (FPOA), a digital signal processor (DSP), an application-specific integrated circuit (ASIC), a field programmable gate array (FPGA), a programmable logic array (PLA), or any other digital processing engine, device or equivalent capable of executing software code and equivalents.

"Program" or "computer program" refers to software code or hardwired code including a series of process steps capable of being executed by a processor.

"Sample" means a finished cellular preparation that is ready for analysis, including all or part of an aliquot or specimen.

"Scanning," as used herein, means translating a microscope lens along an optical axis or changing the optical path distance by some other mechanism, such as a scanning mirror, so as to move its focal plane through a space, such as a capillary tube wherein an object is flowing.

"Specimen" means a complete product obtained from a single test or procedure from an individual patient (e.g., sputum submitted for analysis, a biopsy, or a nasal swab). A specimen may be composed of one or more objects. The result of the specimen diagnosis becomes part of the case diagnosis.

"Subject" as used herein means a human patient.

"Target Cell" refers to a cell from a specimen whose characterization or enumeration is especially desired. For example, in the LuCED test, the target cells are the bronchial epithelial cells. A minimum number of these must be enumerated during the test in order for a specimen to be considered as adequate.

"Target Object" refers to a microscopic object of interest, as for example, a biological cell, cell nucleus, organelle, a human cell, mammal cell, item, thing, other entity or other microscopic biological feature. Any object of interest may be designated as a target object including target cells.

"Threshold" as used in the context of image processing includes a decision boundary value for any measurable characteristic of a feature. Thresholds may be selected or set according to instrument specifications, acceptable error rates, statistics, or other criteria according to accepted pattern recognition principles.

"Voxel" is used in the context of image processing is a volume element on a 3D grid.

Referring to FIG. 1, system components of a 3D optical tomography imaging system used in a lung cancer test system are schematically shown. The cell imaging system 20 is an automated, high-resolution 3D tomographic microscope and computing system for imaging cells in flow. Included are an illumination source 90 optically coupled to a condenser lens 92 which optically cooperates with an objective lens 94 for scanning images of objects 1 contained in a capillary tube 96. Images are obtained by scanning the volume occupied by the object by an oscillating mirror 102 and transmitted through a beam-splitter 104 to a high-speed camera 106. The high-speed camera produces a plurality of pseudo-projection images 110. A set of pseudo-projection images for numerous axial tube rotation positions is produced for each object.

Optical tomography system imaging is performed on a small-volume liquid suspension. For lung cancer detection testing these cells are from the enriched epithelial cell population noted above. Because the optical tomography system can separate closely coincident objects, a narrowly focused core of single file cell flow, although a requirement in standard flow cytometry, is unnecessary for this system.

The operation of examples of lung cancer test systems are described in the Nelson and Fauver references incorporated by reference hereinabove as well as other patents including U.S. Pat. No. 8,254,023 to Watson et al., issued Aug. 28, 2012 and entitled, "Optical Tomography System with High-Speed Scanner," which is also incorporated herein by reference. In operation, stained biological cell 1 is suspended in optical media 112 and injected into a capillary tube 96 having, for example, a 60 μm inner diameter. The optical media 112 is typically a fluid filled cylindrical space centered around a central axis 115 running through the capillary tube 96.

In one useful example, a capillary system has been designed to be disposable, thus eliminating the possibility of cross-contamination between specimens. Pressure 114 applied to the fluid moves objects 1 into position for imaging before 3D data is collected as the tube rotates. A mirror 102 is actuated to sweep the plane of focus through the object, and the image is integrated by the camera to create a pseudo-projection from each single perspective. Not shown is the glass holder that interfaces the capillary tube 96 to the optical tomography system. The holder has a hole cut through the middle that is slightly larger than the outside diameter of the capillary and glass flats on either side to allow optical coupling to the objective and condenser lenses. A capillary tube that is loaded with cells embedded in transport medium is threaded through the holder. The transport media that holds the cells, the glass capillary, capillary holder, oil to interface to the lenses and the lenses themselves are made from materials of the same optical index. As a consequence, rays of light pass through the optical tomography system optics, capillary and cells without refraction while the cell is rotated to allow capture of a set of 500 pseudo-projections is taken as the capillary rotates through 360 degrees. Because the cells are suspended in a fluid medium, they are prone to a small amount of movement while pseudo-projection images 110 are collected.

Cell images in the pseudo-projections, therefore, must be registered to a common center so that the cell features reinforce one another during the reconstruction. U.S. Pat. No. 7,835,561, entitled "Method for Image Processing and Reconstruction of Images for Optical Tomography," discloses error correction techniques for pseudo-projections. U.S. Pat. No. 7,835,561, is hereby incorporated by reference. The set of corrected pseudo-projections is processed using a filtered backprojection algorithm, similar to that in use in conventional X-ray CT, to compute the tomographic 3D cell reconstruction. Pseudo-projections images 110 taken at three angular positions: 0°, 90° and 180° are shown. Illumination is provided by a light source 90 at 585 nm wavelength to optimize image contrast based on the hematoxylin absorption spectrum. In the reconstruction, 3D pixels or voxels are cubic, with a size of 70 nm in each dimension. Reconstruction volumes vary in size, as the image collection volume is cropped around the object. Typically, volumes are approximately 200-300 pixels on a side.

Figure 2:
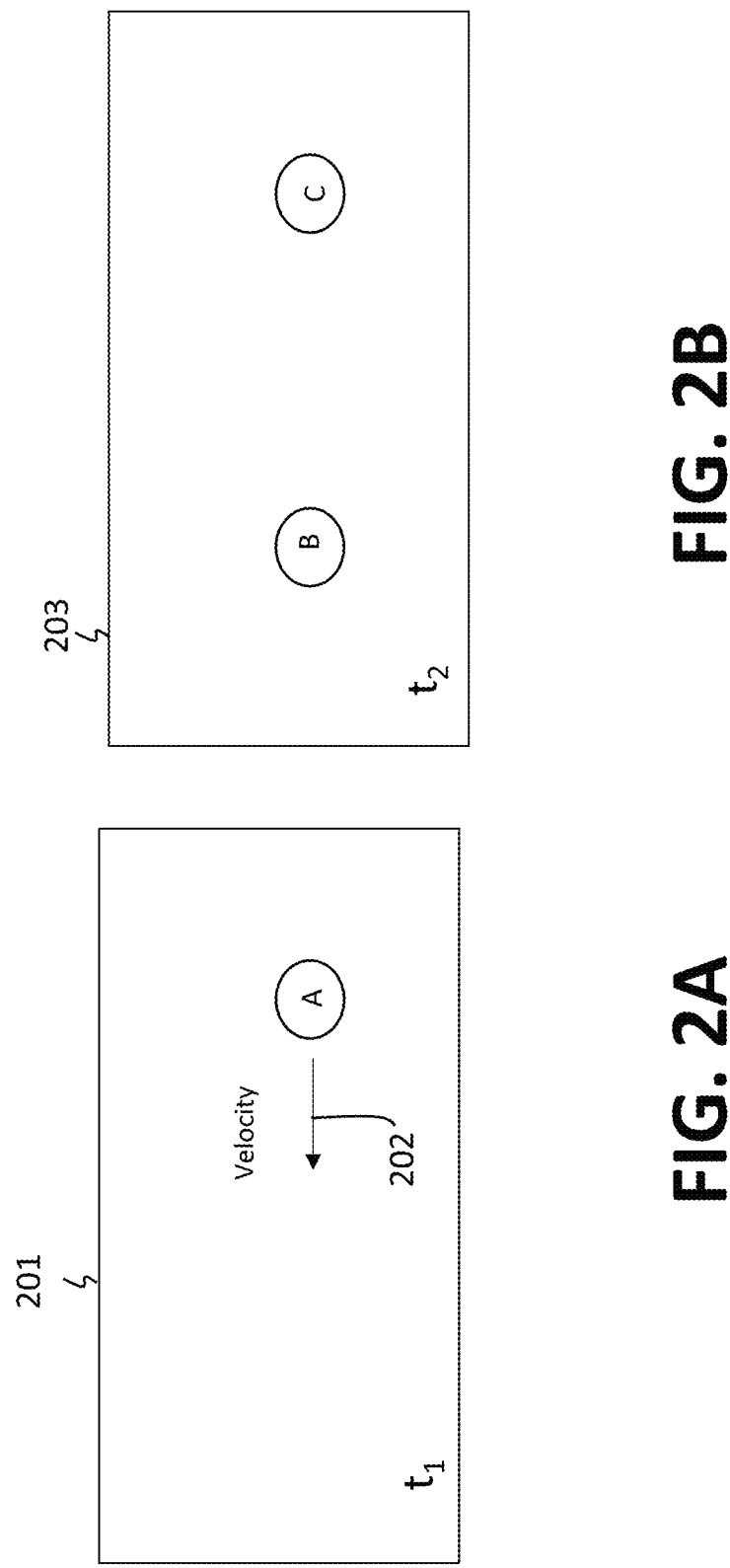
FIG. 2A and FIG. 2B schematically illustrate object images scanned at different times exemplifying the need for object tracking.

Referring now to FIG. 2A and FIG. 2B, frame images acquired at different times exemplifying the need for object tracking are schematically illustrated. The cell imaging system 20 optically monitors the interior of the capillary to detect cells of interest. After the capillary tube is inserted into the system two-dimensional images of objects in the tube are acquired while pressure is applied to the tube moving the objects. The capillary tube is not rotated while a focus scan for locating objects, determining object velocities and identifying objects is being performed. If acquired objects are deemed to be target objects, the tube may then be rotated to acquire tomographic image slices which are subsequently reconstructed into 3D objects, as described above. In one example of such a cell imaging system, the microscope has a relatively small depth of field (~1 micron) compared to the relatively large capillary inner diameter (~62 microns), it is necessary to scan the focus position of the microscope backwards and forwards along the optical axis through the capillary interior to avoid missing any objects.

Target objects may include microscopic objects of interest, as for example, a target cell like a biological cell, cell nucleus, organelle, a human cell, mammal cell, or other microscopic biological feature. Target cells are target objects that include a cell from a specimen whose characterization or enumeration is especially desired. Target cells for optical tomography, particularly in the case of cancer cell analysis include specimens obtained from sputum, blood, urine, cervical scrapes, bowel scrapes, skin scrapes, plural effusion and any liquid biopsy. For example, in the LuCED test, the target cells are bronchial epithelial cells.

When detecting a new object, the cell imaging system 20 determines whether the object is a target object needing to be imaged in 3D. This determination can be based on pattern recognition techniques employing, for example, 2D feature recognition. One such pattern recognition technique is disclosed in U.S. Pat. No. 6,519,355, to Nelson, published Feb. 11, 2003 and entitled "Optical projection imaging system and method for automatically detecting cells having nuclear and cytoplasmic densitometric features associated with disease," the contents of which are incorporated herein by reference.

Thus, to avoid skipping over objects or mistakenly imaging the same object twice, it is important to distinguish one object from another and properly match an object to itself when the same object is seen a second time and/or reappears at multiple subsequent times. In order to properly match reappearing objects, the object velocity must be measured. In a hypothetical, but typical, example, object A is shown in an image 201 at time $t_1$. Later during the next scan at time $t_2$, objects B and C appear in image 203. As will be shown below, calculating the velocity of object A is required in order to determine whether object B, object C or neither are also object A imaged at time $t_2$.

Figure 3:
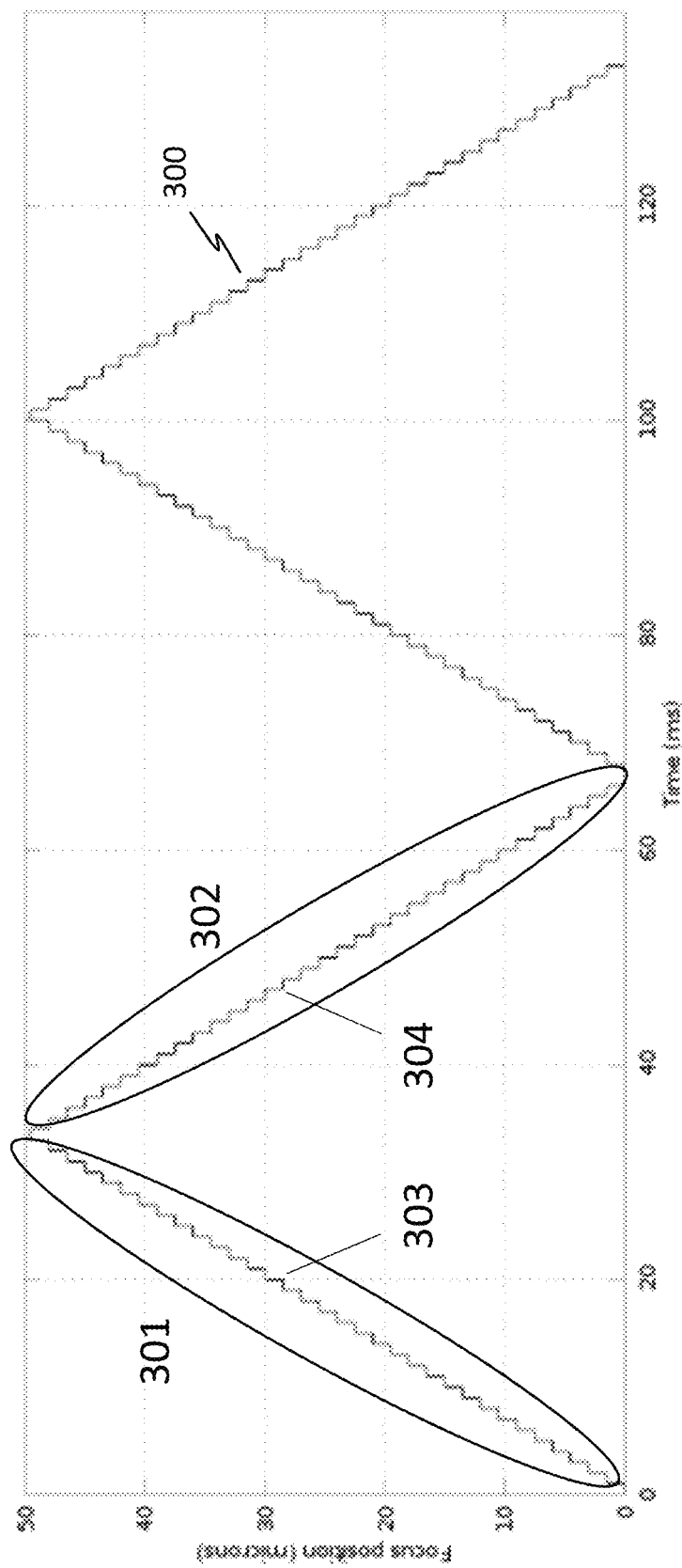
FIG. 3 schematically shows a linear triangular scan pattern.

Referring now to FIG. 3, a linear triangular scan pattern is schematically shown. The triangular pattern 300 represents scanning of a microscope objective lens along the optical axis as plotted in Cartesian coordinates against focus position in microns (μm) on the Y-axis and time in milliseconds (ms) on the X-axis. In this example, the triangular pattern has a step size of about 1.5 μm per step. The triangular pattern 300 represents a forward scan 301 of the objective lens substantially linearly forward through 50 μm at about 36 ms and a backward scan 302 from 50 through 0 μm from about 36 ms to about 64 ms. To aid in understanding the principles of the invention, a hypothetical example is shown where an object's locations 303 and 304 are detected at equal focus positions in the scans 301 and 302 respectively. Unfortunately, locations 303 and 304 are separated in time by, in this example, about 25 ms. Thus, an accurate velocity cannot immediately be measured during a single sweep of focus 301, but suffers from a delay as the object's locations 303 and 304 must both be used to accurately calculate velocity. While such a repeating pattern is useful, the velocity measurement can be substantially improved by calculating a nearly instantaneous object velocity, using two images closely spaced in time at the same focus position as explained below. For example, referring again also to FIGS. 2A-2B, if images 201 and 203 were hypothetically captured at positions 303 and 304, it would be difficult to match object A to the correct object B or C if the object was tilted with respect to the focus axis. Tumbling or tilting of an object while in flow can further confuse matters.

Figure 4:
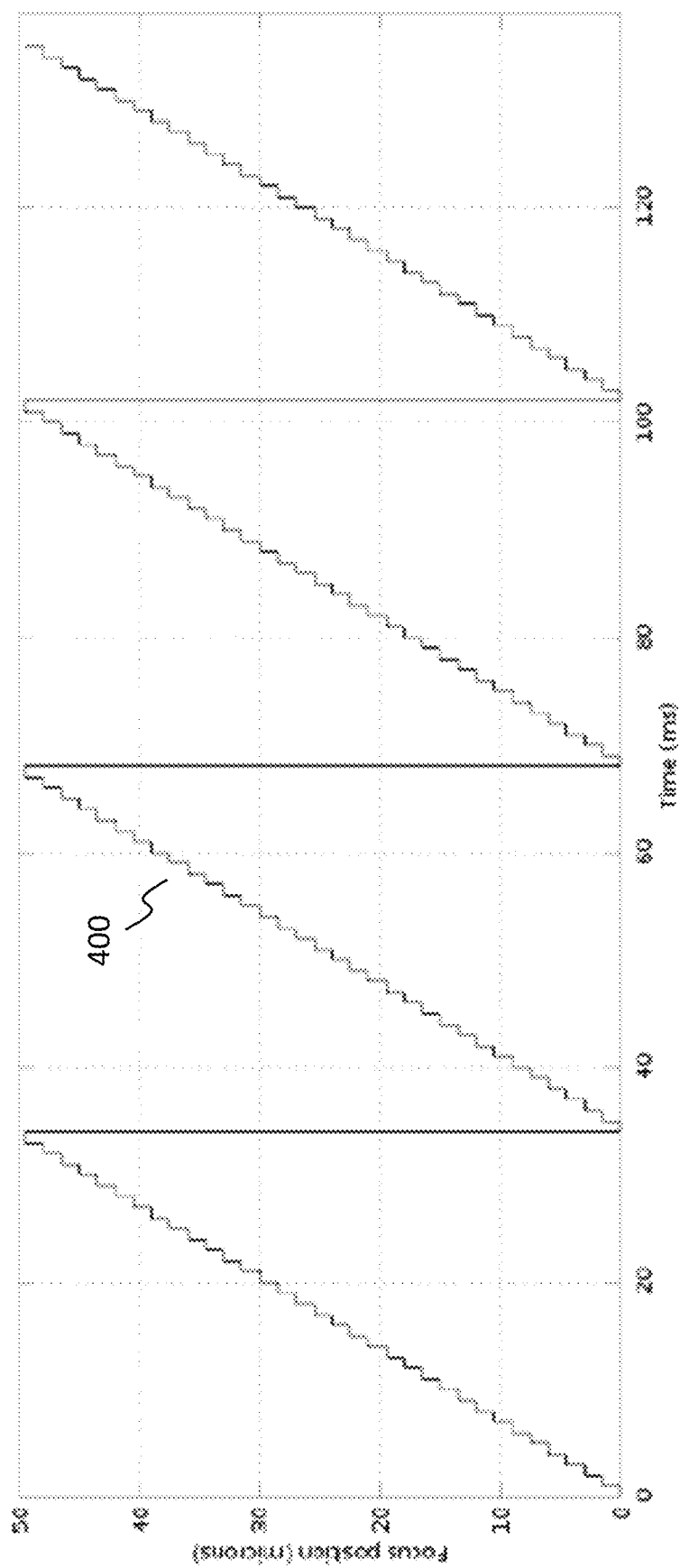
FIG. 4 schematically shows a linear sawtooth scan pattern.

Referring now to FIG. 4, a linear sawtooth scan pattern is schematically shown. As with pattern 300, substantially linear sawtooth pattern 400 represents scanning of a microscope objective lens along the optical axis as plotted in Cartesian coordinates against focus position in microns (μm) on the Y-axis and time in milliseconds (ms) on the X-axis. The sawtooth pattern 400 represents a forward scan of the objective lens substantially linearly forward through 50 μm at about 36 ms starting at a selected focus position normalized to 0 μm, for example. The forward scan is repeated in a cyclical fashion and no backward scan is used. The issues discussed above with respect to triangular pattern 300 also exists in the sawtooth pattern 400.

Figure 5:
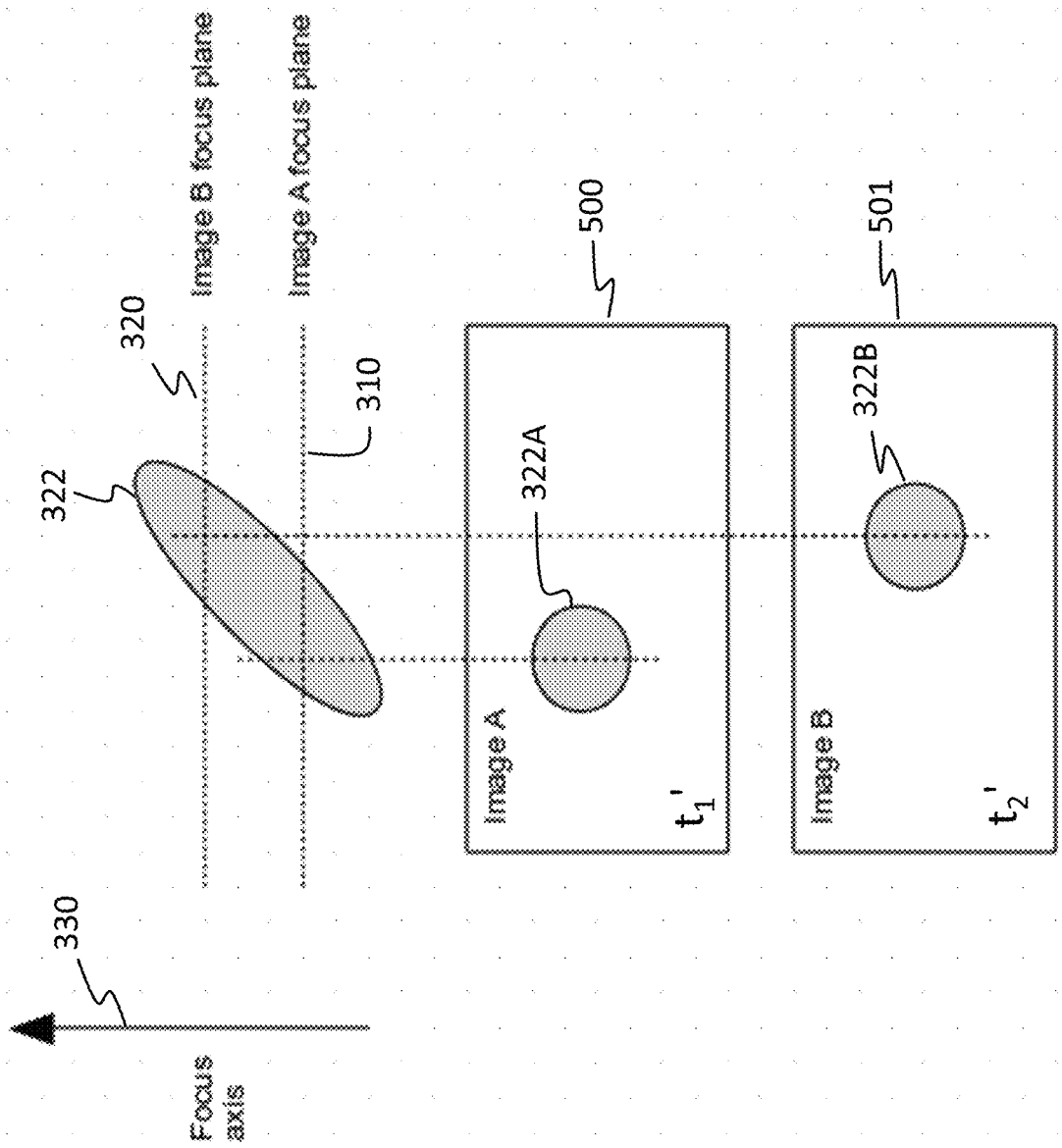
FIG. 5 schematically illustrates deficiencies of using a linear focus scanning pattern for measuring object velocity.

Referring now to FIG. 5 deficiencies of using a linear focus scanning pattern for measuring object velocity are illustrated. The deficiencies of using continuous linear scanning become apparent when imaging, for example, an oblong cell 322 oriented diagonally with respect to the focus axis 330. A first image A, in frame 500 is taken at time $t_1'$ and a first focus plane 310 registering object image 322A. A second image B, in frame 501, is taken at time $t_2'$ at a second image focal plane 320 registering object image 322B. Depending on its size and orientation, object 322 can appear to move between image A at time $t_1'$ and image B at time $t_2$, even if the object is actually stationary. Thus, any velocity calculation based on the perceived object positions in image A and image B lack accuracy. Further, the object 322 cannot be accurately tracked from one image frame to another.

Figure 6:
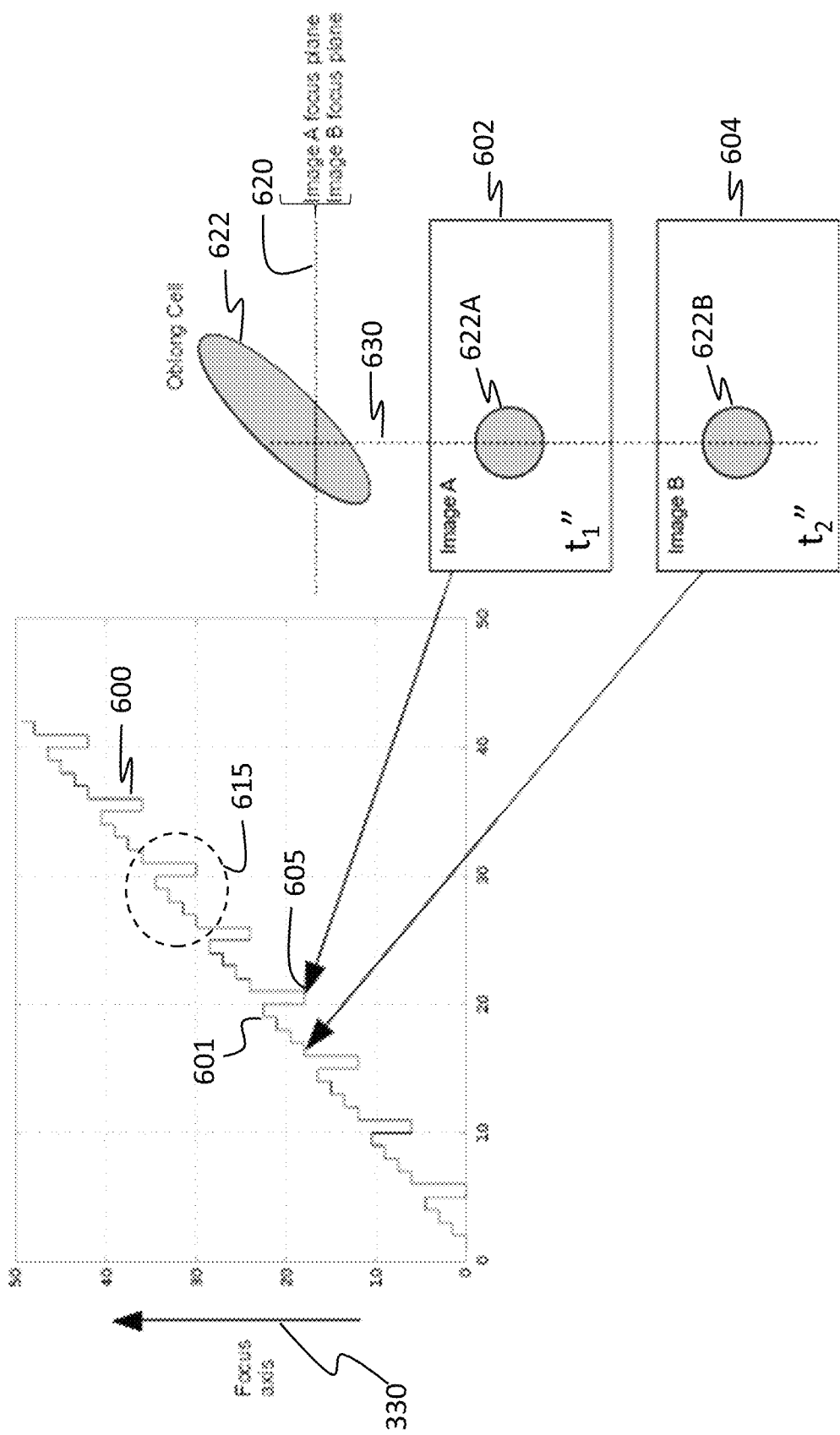
FIG. 6 schematically shows one example of an interrupted stepped object search pattern used for microscopic object velocity measurement.

Referring now to FIG. 6 one example of an interrupted stepped object search pattern used for microscopic object velocity measurement is schematically shown. One example of a suitable pattern for increasing object velocity measurement accuracy is to image the object twice in the same focus plane within the same focus scan. An interrupted stepped pattern 600 comprises a series of sub-patterns 615. Each sub-pattern 615 comprises a plurality of advancing focus steps 601 interrupted by at least one backward focus step 605. The advancing focus steps 601 move the objective lens focus plane in a first direction through the capillary tube space. The backward focus step 605 moves the objective lens focus plane in the reverse direction by an amount equal to the rise of the sub-pattern. In this interrupted stepped pattern 600, an image at the objective lens focus position is captured by a camera, then the objective lens is periodically moved back to capture a subsequent image at the same focus position during a single focus scan through the capillary tube space.

Using an example of a similarly oriented cell as described above with reference to FIG. 5, an oblong cell 622 is oriented diagonally with respect to the focus axis 330. A first image A, including object image 622A, in frame 602 is taken at time $t_1''$ and a second image B, including object image 622B, is taken at time $t_2''$ in frame 604. In this case, the focal plane 620 for image A and image B will substantially coincide due to the interrupted scan pattern. Thus, image A and image B are now captured at the same focus position, so, in the case where the object is not moving, no apparent motion is seen in the oblong cell between the two images as indicated by broken line 630 running through the center of the images 622A, 622B in both image frames. As a result, whether or not the object is moving, the apparent velocity is accurate and no longer dependent on the orientation of the cell.

In one example of an optical tomography cell imaging system, the camera or image sensor has a frame rate of one image per millisecond. The maximum flow rate for an object in a typical system is about 800 μm/s. When a target object is identified flow is stopped and the capillary tube is rotated so that multiple pseudo-projection images from different rotation angles can be acquired. The pseudo-projection images are then used for 3D reproduction of the objects.

Those skilled in the art having the benefit of this disclosure can appreciate that using an interrupted pattern for scanning such as described hereinabove, increases the repetition rate for accurately measuring velocity on object from about 80 ms to about 6 ms, and, more preferably, from about 60 ms to about 6 ms. Because of this increase in repetition rate for measuring velocity cells are more accurately tracked.

Because using the interrupted patterns as described above increases repetition rate for measuring velocity for an object it may be possible to measure velocity on the same object multiple times within a single scan through the capillary tube space. Note that the scan may be performed on the volume around the central axis of the capillary tube in a space having a diameter of about 50 micrometers. The areas around the walls of the capillary tube need not be scanned as objects in flow are focused into the space centered about the central axis of the capillary tube.

Figure 7:
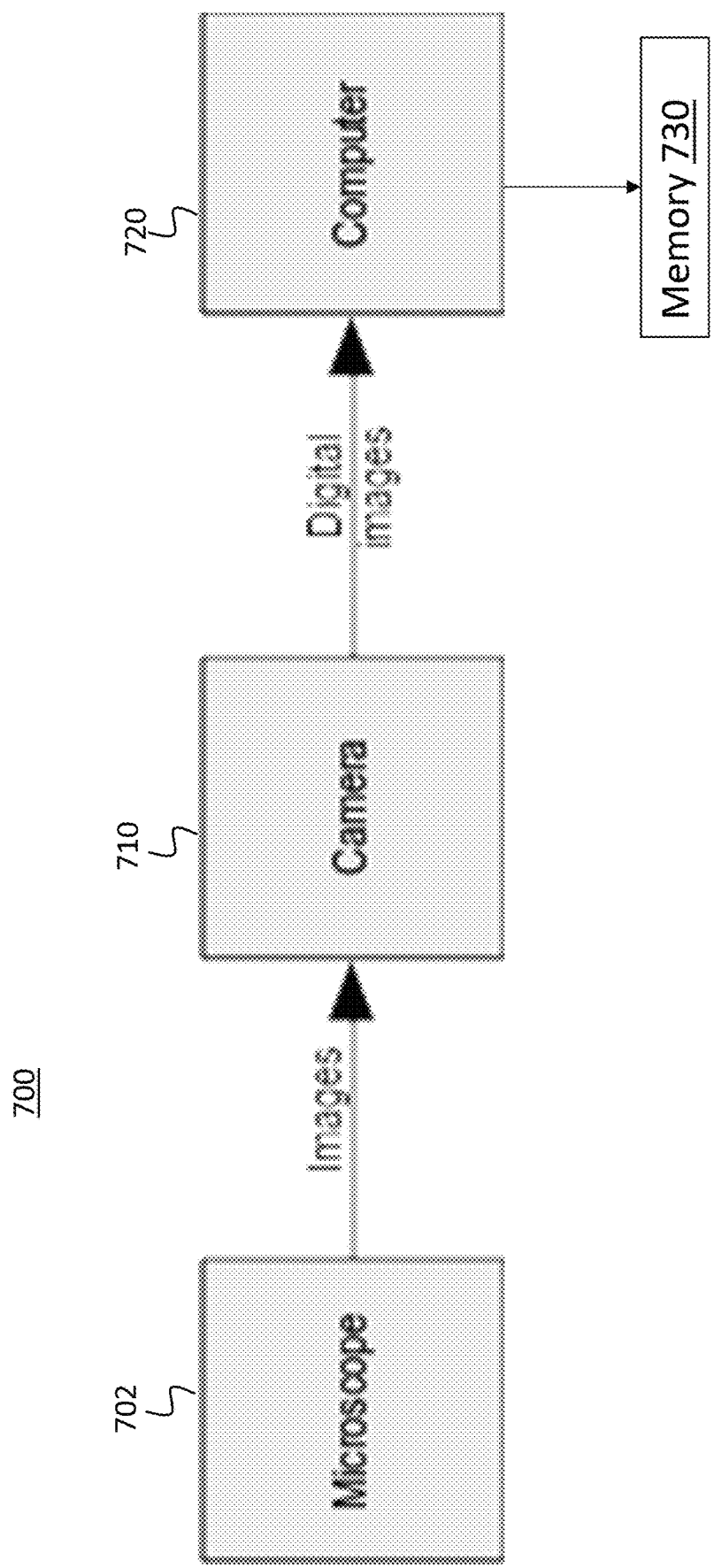
FIG. 7 schematically shows one example of a simplified block diagram of components used in an optical tomography system for measuring velocities for and tracking microscopic objects in flow.

FIG. 7 schematically shows a simplified block diagram of components used in an optical tomography system for measuring velocities for and tracking microscopic objects in flow. An optical tomography system 700 includes a microscope 702, a camera 710 and a computer or processor 720. The processor 720 may include or be coupled to a memory storage device 730. The microscope 702 focuses on objects in a capillary tube (as shown above with reference to FIG. 1) and optically transmits those images to a camera 710. The camera 710 comprises light sensors which transform the optical images into digital images. The digital images are then transmitted to the computer 720. A more detailed explanation of the operations of an optical tomography system can be found, for example in Fauver '945.

Figure 8:
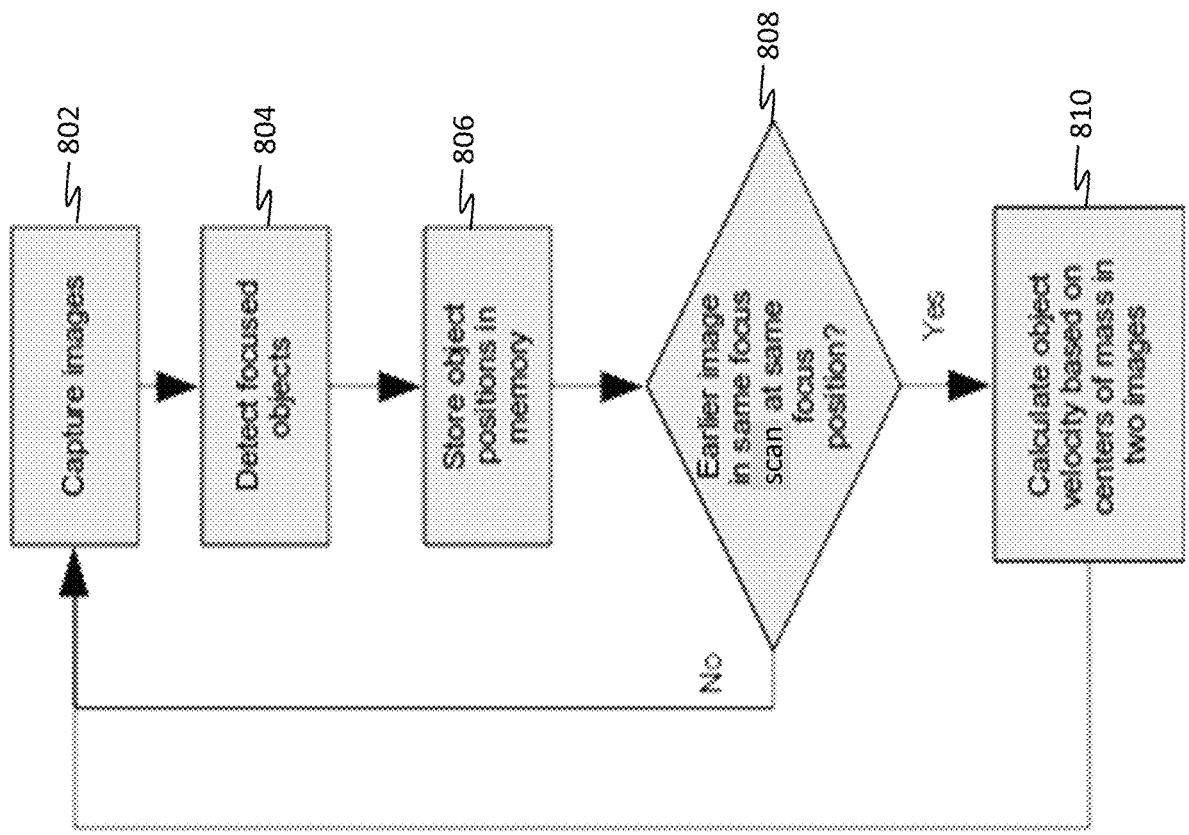
FIG. 8 schematically shows one example of a flow diagram of the velocity measurement method of the invention.

FIG. 8 schematically shows a flow diagram of the velocity measurement method of the invention. Now for the first time, a method 800 for accurately measuring the velocity of microscopic objects in flow in a capillary tube is described. Initially, images of objects are captured 800. As the objective lens is scanned through the capillary tube focused objects are detected 804. As each focused object is detected its position along the optical axis is stored in memory 806. Objects detected in a second or subsequent image frame are compared to images detected at the same focus position from a previous image frame 808. If two images are not detected at the same focus position during the same focus scan, the method repeats starting at the act of capturing images 802. If two objects are detected in two image frames at the same focus position, they are identified as the same object and the velocity calculation is made using the centers of mass of the two object images as reference points to measure time and distance 810. Once the velocity of the object is known it can be identified and tracked as it moves throughout the length of the capillary tube.

Following the steps above, the velocity of a microscopic object in flow can be determined by scanning a microscope focal plane through a fluid filled space to image objects, where the scanning follows an interrupted repeating pattern having sub-patterns where the sub-patterns position the microscope focus plane beginning at a selected focus position at a first time and ending at the selected focus position at a later second time; operating a sensor to register images in image frames during the scanning; registering a first object image in a first image frame at the selected focus position; registering a second object image and a second image frame at the selected focus position; identifying the object in the first object image and the second object image as the same object; and operating a processor to determine a velocity for the identified object.

Figure 9:
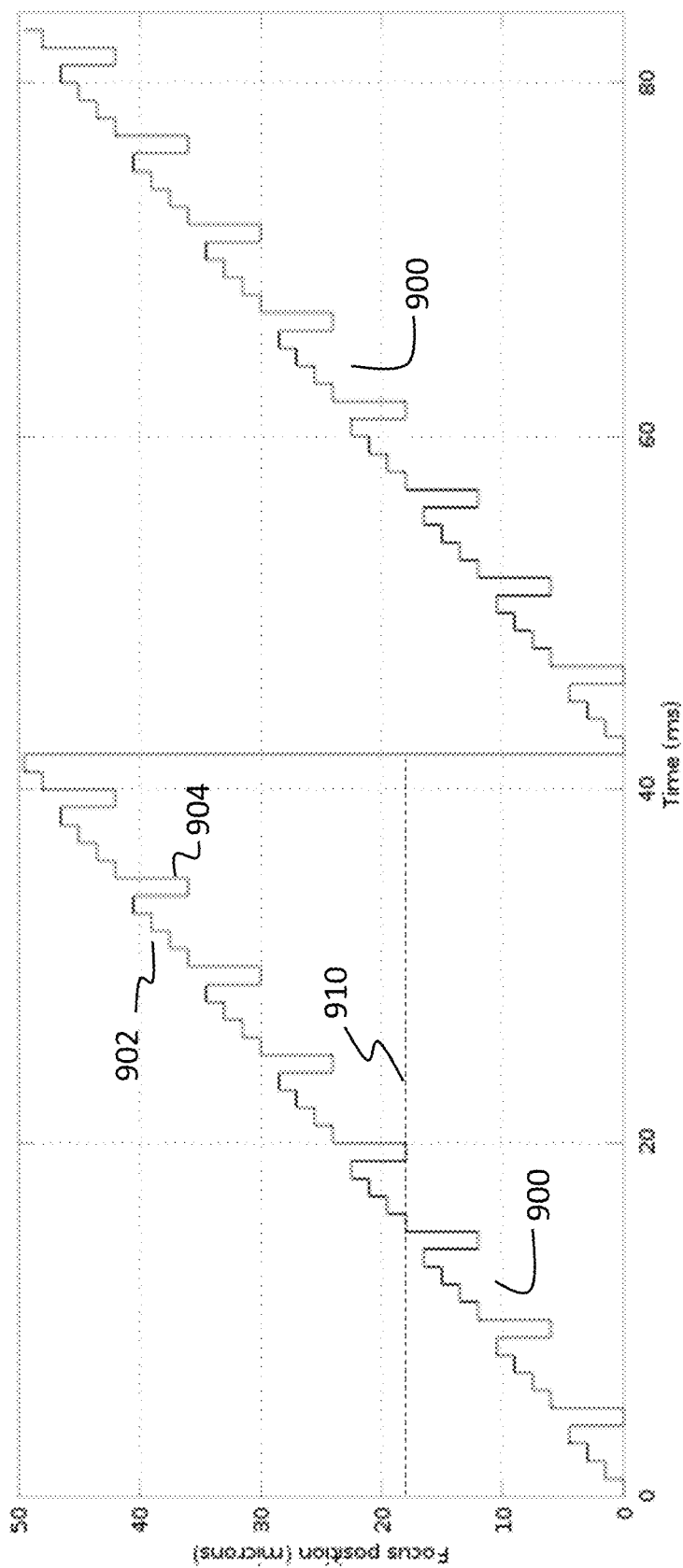
FIG. 9 schematically shows one example of an interrupted sawtooth scan pattern.

Referring now to FIG. 9, an interrupted sawtooth scan pattern is schematically shown. An interrupted sawtooth scan pattern 900 comprises repeated sub-patterns including a plurality of rising steps 902 interrupted by a backward step 904. The interrupted sawtooth pattern 900 represents and can be used to control scanning of a microscope objective lens along the optical axis as plotted in Cartesian coordinates against focus position in microns ($\mu$m) on the Y-axis and time in milliseconds (ms) on the X-axis. In this example, the interrupted sawtooth pattern has a rising step size of about 1.5 $\mu$m per step and the sub-pattern repeats about every 5 ms. The interrupted sawtooth pattern 900 represents a forward scan of the objective lens substantially linearly forward through 50 $\mu$m at about 42 ms. In this way, an image of an object at, for example, focus position 910 will be taken twice within a few milliseconds. If the object is in substantially the same focus position and close to the same position in the image, it is identified as the same object as the previous image and its velocity can be measured. It can be tracked from image frame to image frame. If it is identified as a target object, the object flow in the capillary tube can be substantially stopped and the tube rotated to acquire multiple images from various angles so as to enable three-dimensional reconstruction of the object.

Figure 10:
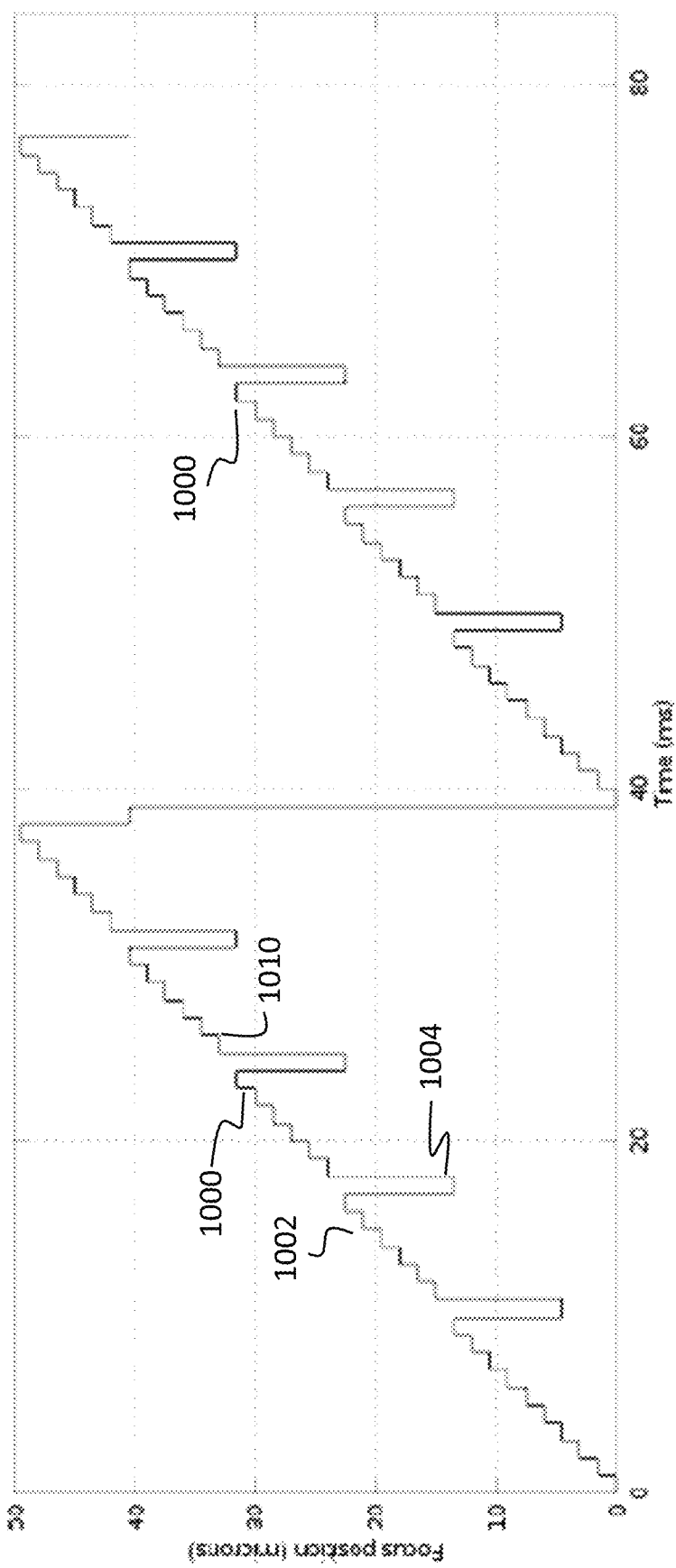
FIG. 10 schematically shows an alternate example of an interrupted sawtooth scan pattern.

Referring now to FIG. 10, an interrupted sawtooth scan pattern is schematically shown. An interrupted sawtooth scan pattern 1000 comprises repeated sub-patterns including a plurality of rising steps 1002 interrupted by a backward step 1004. The interrupted sawtooth pattern 1000 represents and can be used to control scanning of a microscope objective lens along the optical axis as plotted in Cartesian coordinates against focus position in microns ($\mu$m) on the Y-axis and time in milliseconds (ms) on the X-axis. In this example, the interrupted sawtooth pattern has a rising step size of about 1.5 $\mu$m per step and the sub-pattern repeats about every 5 ms. The interrupted sawtooth pattern 1000 represents a forward scan of the objective lens substantially linearly forward through 50 $\mu$m at about 42 ms. In this way, an image of an object at focus position 910 will be taken twice within a few milliseconds. As described above with respect to FIG. 9, if the object is in substantially the same focus position in two different images, its velocity can be measured and it can be tracked from image frame to image frame. If it is identified as a target object, the object flow in the capillary tube can be substantially stopped and the tube rotated to acquire multiple images from various angles so as to enable three-dimensional reconstruction of the object.

The invention has been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by different equipment and devices, and that various modifications, both as to the equipment details and operating procedures, may be accomplished without departing from the true spirit and scope of the present invention.

What is claimed is:

1. A method for measuring microscopic object velocities in fluid flow comprising:

operating an objective lens and a confocal lens for scanning a microscope focal plane through a fluid filled space to image objects, where the scanning follows an interrupted repeating pattern having sub-patterns where the sub-patterns position the microscope focus plane beginning at a selected focus position at a first time and ending at the selected focus position at a later second time;

operating a sensor to register images in image frames during the scanning;

registering a first object image in a first image frame at the selected focus position;

registering a second object image and a second image frame at the selected focus position;

identifying the object in the first object image and the second object image as the same object; and operating a processor to determine a velocity for the identified object.

2. The method of claim 1 further comprising the step of determining whether the object is a target object.

3. The method of claim 2 wherein the object is selected from the group consisting of a biological cell, bronchial epithelial cells, a cell nucleus, an organelle, a human cell, mammal cell, and a microscopic biological feature.

4. The method of claim 2 wherein the target object is selected from the group consisting of objects obtained from specimens including sputum, blood, urine, cervical scrapes, bowel scrapes, skin scrapes, plural effusion and a liquid biopsy.

5. The method of claim 1 wherein the scanned fluid filled space comprises a cylindrical space centered around a central axis running through a capillary tube.

6. The method of claim 1 wherein the objects have a maximum flow rate of 800 μm/s.

7. The method of claim 1 wherein the sub-pattern repetition rate is less than 10 ms.

8. The method of claim 1 wherein the act of identifying an object further comprises storing the object's position.

9. The method of claim 8 wherein operating the processor to determine a velocity comprises making a velocity calculation using the centers of mass of the two object images as reference points to measure time and distance.

10. The method of claim 1 further comprising tracking the identified object.

11. A system for measuring microscopic object velocities in fluid flow comprising:

a scanner control coupled to a scanning mirror for operating an objective lens and a confocal lens for scanning a microscope focal plane through a fluid filled space to image objects, where the scanning follows an interrupted repeating pattern having sub-patterns where the sub-patterns position the microscope focus plane beginning at a selected focus position at a first time and ending at the selected focus position at a later second time;

a sensor positioned to receive signals transmitted from the microscope to register images in image frames during the scanning;

wherein the sensor registers a first object image in a first image frame at the selected focus position and wherein the sensor produces a first signal output;

wherein the sensor registers a second object image and a second image frame at the selected focus position and wherein the sensor produces a second signal output; and a processor coupled to receive the first signal output and the second signal output, the processor including a program for identifying the object in the first object image and the second object image as the same object and for determining a velocity for the identified object.

12. The system of claim 11 wherein the processor includes a pattern recognition program for determining whether the identified object is an object of interest.

13. The system of claim 12 wherein the object is selected from the group consisting of a biological cell, bronchial epithelial cells, a cell nucleus, an organelle, a human cell, mammal cell, and a microscopic biological feature.

14. The system of claim 12 wherein the target object is selected from the group consisting of objects obtained from specimens including sputum, blood, urine, cervical scrapes, bowel scrapes, skin scrapes, plural effusion and a liquid biopsy.

15. The system of claim 11 wherein the scanned fluid filled space comprises a cylindrical space centered around a central axis running through a capillary tube.

16. The system of claim 11 wherein the objects have a maximum flow rate of 800 μm/s.

17. The system of claim 11 wherein the sub-pattern repetition rate is less than 10 ms.

18. The system of claim 11 wherein the processor includes a memory for storing the object's position.

19. The system of claim 18 wherein the program for determining a velocity comprises making a velocity calculation using the centers of mass of the two object images as reference points to measure time and distance.

20. The system of claim 11 further comprises a processor programmed for tracking the identified object.

21. The method of claim 1 further comprising measuring velocity on the same object multiple times within a single scan through the fluid filled space.

22. The system of claim 11 wherein the processor includes a program for measuring velocity on the same object multiple times within a single scan through the fluid filled space.

23. A method for measuring microscopic object velocities in fluid flow comprising:

operating an objective lens and a confocal lens for scanning a microscope focal plane through a fluid filled space to image objects, where the scanning follows a repeating pattern where the repeating pattern positions the microscope focus plane beginning at a selected focus position at a first time and ending at the selected focus position at a later second time;

operating a sensor to register images in image frames during the scanning;

registering a first object image in a first image frame at the selected focus position;

registering a second object image and a second image frame at the selected focus position;

identifying the object in the first object image and the second object image as the same object; and operating a processor to determine a velocity for the identified object.

24. The method of claim 23 further comprising the step of determining whether the object is a target object.

25. The method of claim 24 wherein the object is selected from the group consisting of a biological cell, bronchial epithelial cells, a cell nucleus, an organelle, a human cell, mammal cell, and a microscopic biological feature.

26. The method of claim 24 wherein the target object is selected from the group consisting of objects obtained from specimens including sputum, blood, urine, cervical scrapes, bowel scrapes, skin scrapes, plural effusion and a liquid biopsy.

27. The method of claim 23 wherein the scanned fluid filled space comprises a cylindrical space centered around a central axis running through a capillary tube.

28. The method of claim 23 wherein the objects have a maximum flow rate of 800 µm/s.

29. The method of claim 23 wherein the repeating pattern repetition rate is less than 80 ms.

30. The method of claim 23 wherein the act of identifying an object further comprises storing the object's position.

31. The method of claim 23 wherein operating the processor to determine a velocity comprises making a velocity calculation using the centers of mass of the two object images as reference points to measure time and distance.

32. The method of claim 23 further comprising tracking the identified object.

\* \* \* \* \*